US010311387B2

(12) United States Patent
Seo et al.

(10) Patent No.: US 10,311,387 B2
(45) Date of Patent: Jun. 4, 2019

(54) REMOTE ENERGY MANAGEMENT TO CONTROL HOUSEHOLD ELECTRICAL APPLIANCES BASED ON ELECTRICITY PRICING

(75) Inventors: Ho-Seok Seo, Daejeon (KR); Yoon-Kee Kim, Yongin-si (KR)

(73) Assignee: KT Corporation, Seongnam (KR)

( * ) Notice: Subject to any disclaimer, the term of this patent is extended or adjusted under 35 U.S.C. 154(b) by 366 days.

(21) Appl. No.: 13/590,715

(22) Filed: Aug. 21, 2012

(65) Prior Publication Data

US 2013/0159052 A1    Jun. 20, 2013

(30) Foreign Application Priority Data

Dec. 16, 2011   (KR) .................... 10-2011-0136408

(51) Int. Cl.
    *G06Q 10/06*    (2012.01)
(52) U.S. Cl.
    CPC .................. *G06Q 10/06* (2013.01)
(58) Field of Classification Search
    USPC ...................................... 705/7.31
    See application file for complete search history.

(56) References Cited

U.S. PATENT DOCUMENTS

| 6,351,737 | B1* | 2/2002 | Williams | ............. | G01R 21/133 |
| | | | | | 705/34 |
| 7,667,582 | B1* | 2/2010 | Waldorf | ......................... | 340/440 |
| 8,466,875 | B2* | 6/2013 | Nakada et al. | ............... | 345/157 |

| 2002/0059126 | A1* | 5/2002 | Ricciardi | ........................ | 705/36 |
| 2004/0225648 | A1* | 11/2004 | Ransom | ................ | G01D 4/004 |
| 2006/0036542 | A1* | 2/2006 | McNair | ........................... | 705/39 |
| 2008/0022238 | A1* | 1/2008 | Ito | .................................... | 716/4 |
| 2010/0064001 | A1* | 3/2010 | Daily | ..................... | G06Q 30/02 |
| | | | | | 709/203 |
| 2010/0094532 | A1* | 4/2010 | Vorona | ......................... | 701/119 |
| 2010/0185654 | A1* | 7/2010 | Fortuna et al. | ............... | 707/769 |

(Continued)

FOREIGN PATENT DOCUMENTS

| JP | 2003-248773 A | 9/2003 |
| KR | 10-2011-0099542 A | 9/2011 |

(Continued)

OTHER PUBLICATIONS

Livengood, The Energy Box: Locally Automated Optimal Control of Residential Electricity Usage, p. 10 (Year: 2009).*

*Primary Examiner* — Renae Feacher
*Assistant Examiner* — Venay K Puri
(74) *Attorney, Agent, or Firm* — Sughrue Mion, PLLC

(57) ABSTRACT

A demand response system and method. The demand response system includes a power rate reception unit for receiving information about charge rates for a unit of power from an external power trading server. An amount-of-power used reception unit receives information about amounts of power used by a customer from a gateway, a first data generation unit which generates first data including information about charge rates for a unit of power for respective time spans, a second data generation unit which generates second data including information about amounts of power used by the customer for the respective time spans, and a third data generation unit which generates third data including information about index power charges for the customer for the respective time spans.

17 Claims, 12 Drawing Sheets

(56) References Cited

U.S. PATENT DOCUMENTS

| | | | |
|---|---|---|---|
| 2010/0235771 A1* | 9/2010 | Gregg, III | 715/769 |
| 2010/0289652 A1* | 11/2010 | Javey | H04Q 9/00 340/605 |
| 2010/0299284 A1* | 11/2010 | Gristina | G06T 11/206 705/412 |
| 2011/0264286 A1* | 10/2011 | Park | 700/286 |
| 2011/0282505 A1* | 11/2011 | Tomita et al. | 700/291 |
| 2012/0016528 A1* | 1/2012 | Raman | G06F 9/5094 700/291 |
| 2012/0030269 A1* | 2/2012 | Rubio et al. | 708/270 |
| 2012/0197441 A1* | 8/2012 | Kim | G05B 15/02 700/275 |
| 2012/0256755 A1* | 10/2012 | Tsujimura | 340/657 |
| 2012/0310425 A1* | 12/2012 | Kang | 700/286 |
| 2013/0030553 A1* | 1/2013 | Lee et al. | 700/22 |
| 2013/0096726 A1* | 4/2013 | Lyren | H02J 3/14 700/291 |
| 2013/0117004 A1* | 5/2013 | Schultz et al. | 703/18 |
| 2013/0268651 A1* | 10/2013 | Greenzeiger | 709/224 |

FOREIGN PATENT DOCUMENTS

| | | |
|---|---|---|
| KR | 10-2011-0114437 A | 10/2011 |
| KR | 10-2011-0125541 A | 11/2011 |

* cited by examiner

REMOTE ENERGY MANAGEMENT TO CONTROL HOUSEHOLD ELECTRICAL APPLIANCES BASED ON ELECTRICITY PRICING

CROSS-REFERENCE TO RELATED APPLICATIONS

This application claims the benefit of priority from the Korean Patent Application No. 10-2011-0136408, filed with the Korean Intellectual Property Office on Dec. 16, 2011, the disclosure of which is incorporated herein by reference in its entirety.

BACKGROUND OF THE INVENTION

1. Field of the Invention

Exemplary embodiments relate to a demand response system and method thereof, and more particularly, exemplary embodiments relate to a demand response system and method thereof, which collect information and control electric home appliances of a customer using information and communication technology.

2. Description of Related Art

A power system requires a balance between a supply and a demand. This is important in reasonably utilizing limited energy resources. For this purpose, the necessity of demand management has been emphasized, and research into Demand Response (DR) that is a developed form of demand management has recently increased. Such demand response can be defined as a variation in a consumption/usage pattern depending on a variation in a power rate. Further, demand response can be defined as an incentive payment for suppressing the use of electricity when a market price is high. Demand response also includes an intentional process for changing a consumption pattern, as in the latter case. The demand response of consumers can be derived so that customers can reduce their power consumption while enduring inconvenience during a period in which a power rate is high. An example of this activity is to temporarily stop the usage of air conditioners in the hot summer.

A related art related to such a demand response system includes various technologies disclosed in Korean Unexamined Patent Application Publication Nos. 10-2011-0114437, 10-2011-0095758, 10-2011-0099542, etc.

This related art controls loads (electric home appliances or the like) depending on a real-time power rate or the amount of power used by a customer. Control is mainly performed depending on a real-time variation in the power rate so that when the power rate is high, the use of electric home appliances is restrained, and when the power rate is low, the operations of the electric home appliances are encouraged. Alternatively, a period in which the power used by a customer is high and a period in which the power used by the customer is low are separated and then the operations of the electric home appliances are controlled. However, the real-time power rate is only a power price in a power trading market, and the amount of power used by the customer is not the actual charge for power used by the customer. That is, an amount of money to be paid by the customer is a charge obtained by multiplying a charge rate for a unit of power by the amount of power used. Generally, a real-time power rate and the amount of power used by the customer are proportional to the charge for power used by the customer, but time points at which the minimum and maximum values are generated may differ.

In an extreme example, if it is assumed that when the real-time power rate is low, the use of power by the customer greatly increases, and that when the real-time power rate is high, the use of power by the customer hardly occurs, the minimum and maximum values of the charge for power used by the customer may appear at time points quite different from the time points at which the minimum and maximum values for the real-time power rate and the amount of power used by the customer appear. Therefore, it is difficult to produce effective results from the control of demand response based on both the real-time power rate and the amount of power used by the customer. Further, the effect of power rate savings felt by the user of a particular customer (e.g., a power supply company) may be insignificant.

SUMMARY

Accordingly, it is an aspect to provide a demand response system and a method thereof based on the real-time charge for power used by a customer.

Another aspect is to provide a demand response system and method thereof, which perform division into dense index sections in a range in which an index power charge is relatively high, thus increasing effectiveness in the control of demand response.

In accordance with an aspect, there is provided a demand response method including generating first data including information about charge rates for a unit of power for respective time spans, and generating second data including information about amounts of power used by a customer for the respective time spans, and generating third data including information about index power charges for the respective time spans calculated based on the first data and the second data.

Preferably, the demand response method may further include dividing the third data into a plurality of index sections.

Preferably, the demand response method may further include calculating real-time charges for power used by a customer by multiplying real-time charge rates for the unit of power by real-time amounts of power used by the customer.

Preferably, the demand response method may further include generating a Demand Response (DR) signal when use of the power is in an index section of the plurality of index sections in which each real-time charge for power is present.

Preferably, the demand response method may further include controlling an electric home appliance in response to receiving the generated DR signal.

Preferably, the first data may be a set of charge rates for the unit of power for the respective time spans, which have been obtained during a specific period of time.

Preferably, the first data may be an average of charge rates for the unit of power for each identical time span that is repeated during a predetermined period of time.

Preferably, the second data may be a set of amounts of power used by the customer for the respective time spans, which have been obtained during a specific period of time.

Preferably, the second data may be a customer baseline load which is an average of amounts of power used by a customer for each identical time span, which is repeated during a predetermined period of time.

Preferably, the dividing the third data into the plurality of index sections may include dividing a range from a minimum index power charge to a maximum index power charge of the third data into a plurality of index sections having an identical size, and dividing one of the plurality of index sections having the maximum index power charge as an upper limit into a plurality of index subsections.

Preferably, the dividing the third data into the plurality of index sections includes dividing a range from a minimum index power charge to a maximum index power charge of the third data into the plurality of index sections where a size of the plurality of index sections increases in a direction from an index section having the maximum index power charge as an upper limit to an index section having the minimum index power charge as a lower limit.

Preferably, the dividing the third data into the plurality of index sections may include dividing a range from a minimum index power charge to a maximum index power charge of the third data into a plurality of index sections where a number of index sections set in a first range having the maximum index power charge as an upper limit is greater than a number of index sections set in a second range having the minimum index power charge as a lower limit and where the second range has a size identical to the first range.

Preferably, the dividing the third data into the plurality of index sections may include dividing a range above a preset index power charge into the plurality of index sections.

Preferably, when the real-time charge for power is below a lowest index section, generating a DR signal corresponding to the lowest index section, and when the real-time charge for power is above a highest index section, generating a DR signal corresponding to the highest index section.

In accordance with another aspect, there is provided a demand response method including dividing a range above a preset index power charge into a plurality of index sections, obtaining information about real-time charge rates for a unit of power, obtaining information about real-time amounts of power used, calculating real-time charges for power used by the customer based on the obtained information about the real-time charge rates and based on the obtained information about the real-time amounts, when each of the real-time charges for power is present in one of the plurality of index sections, generating a Demand Response (DR) signal corresponding to the one index section, and controlling an electric home appliance in response to the DR signal.

In accordance with a further aspect, there is provided a demand response system including a power rate reception unit for receiving information about charge rates for a unit of power from an external power trading server, an amount-of-power used reception unit for receiving information about amounts of power used by a customer from a gateway installed in premises of the customer, a first data generation unit for generating first data including information about charge rates for the unit of power for respective time spans based on the received information about the charge rates, a second data generation unit which generates second data including information about amounts of power used by the customer for respective time spans based on the received information about the amounts of power used, and a third data generation unit for generating third data including information about index power charges for the customer for the respective time spans obtained based on the first data and the second data.

Preferably, the demand response system may further include a Demand Response (DR) signal control unit for dividing the index power charges of the third data into a plurality of index sections.

Preferably, the demand response system may further include a real-time charge for power calculation unit for calculating real-time charges for power used by the customer by multiplying the real-time charge rates for the unit of power, which are received from the power rate reception unit, by the real-time amounts of power used by the customer, which are received from the amount-of-power used reception unit.

Preferably, when each of the real-time charges for power is present in one of the plurality of index sections, a DR signal corresponding to the one index section is generated by the DR signal control unit.

BRIEF DESCRIPTION OF THE DRAWINGS

The above and other aspects will be more clearly understood from the following detailed description of exemplary embodiments taken in conjunction with the accompanying drawings, in which.

DESCRIPTION OF EXEMPLARY EMBODIMENTS

Hereinafter, exemplary embodiments will be described in detail with reference to the attached drawings.

Figure 1:
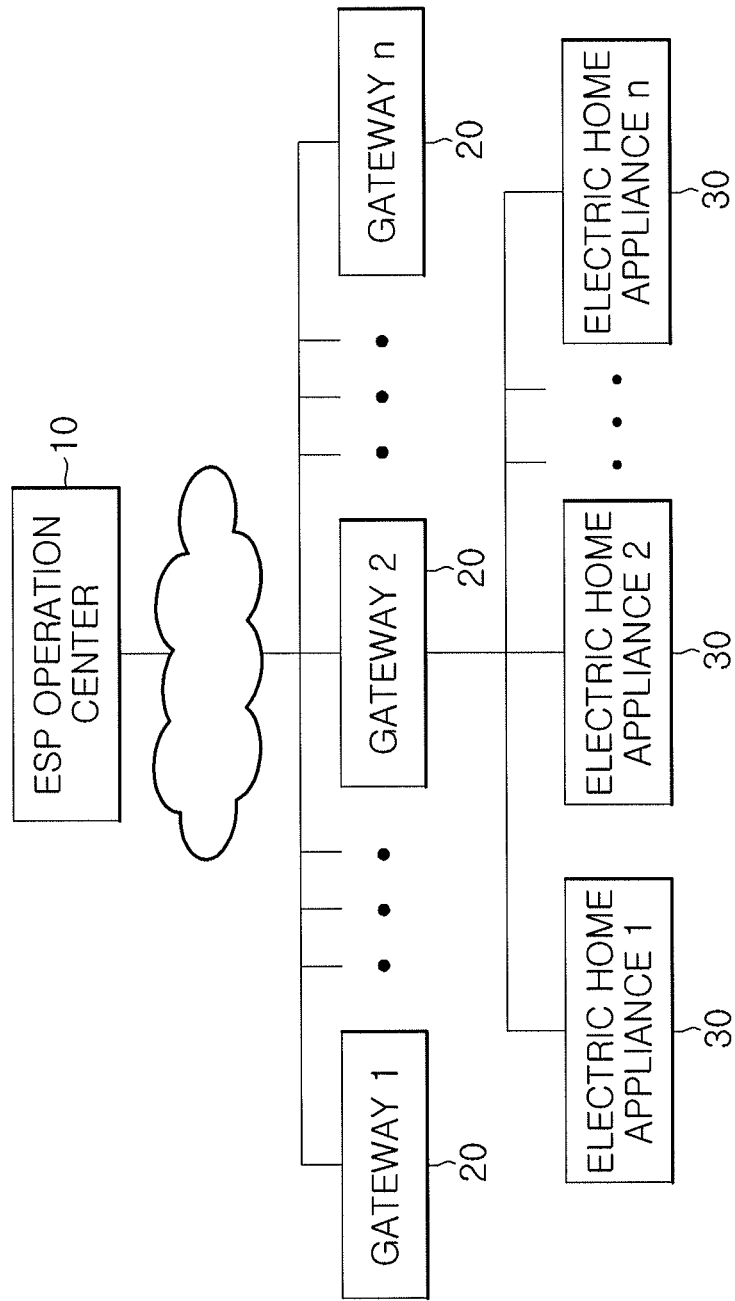
FIG. 1 is a schematic diagram showing the configuration of a demand response system according to an exemplary embodiment.

FIG. 1 is a diagram showing the configuration of a demand response system according to an exemplary embodiment.

As shown in FIG. 1, the demand response system according to an exemplary embodiment may include an Energy Service Provider (ESP) operation center 10 for receiving information about charge rates for unit of power over time from an external power trading server 40 (see FIG. 2), gateways 20 (gateway 1, gateway 2, . . . gateway n) connected to the ESP operation center 10 over a network, and electric home appliances 30 (electric home appliance 1, electric home appliance 2, . . . electric home appliance n) connected to each respective gateway 20 over a network.

Each of the electric home appliances 30 performs a desired function using power flowing thereinto via a power line. Meanwhile, each of the electric home appliances 30 is provided with a smart tag (not shown), and is configured to measure the amount of power used by the respective one of the electric home appliances 30 and transmit the measured amount of power used to a smart meter 50 (see FIG. 2).

The electric home appliances 30 include all types of appliances, including by way of an example only and not by way of a limitation a refrigerator, an air conditioner, a washing machine, a television (TV), an office machine, etc., which consume power.

The ESP operation center 10 is connected to each of the gateways 20 over the network. Further, the ESP operation center 10 is connected to the external power trading server 40 (FIG. 2) over a network. The ESP operation center 10 receives power rate information from the external power trading server 40, and receives information about the amount of power used by a customer from a respective one of the gateways 20. Further, the ESP operation center 10 calculates information about the index power charges to the customer using both the power rate information and the amount-of-power used by the customer information and divides the calculated information into index sections. Furthermore, the ESP operation center 10 calculates the real-time charges for power used by the customer. Furthermore, when each real-time charge for power is present in any one of the index sections, the ESP operation center 10 generates a Demand Response (DR) signal corresponding to the one index section.

Figure 2:
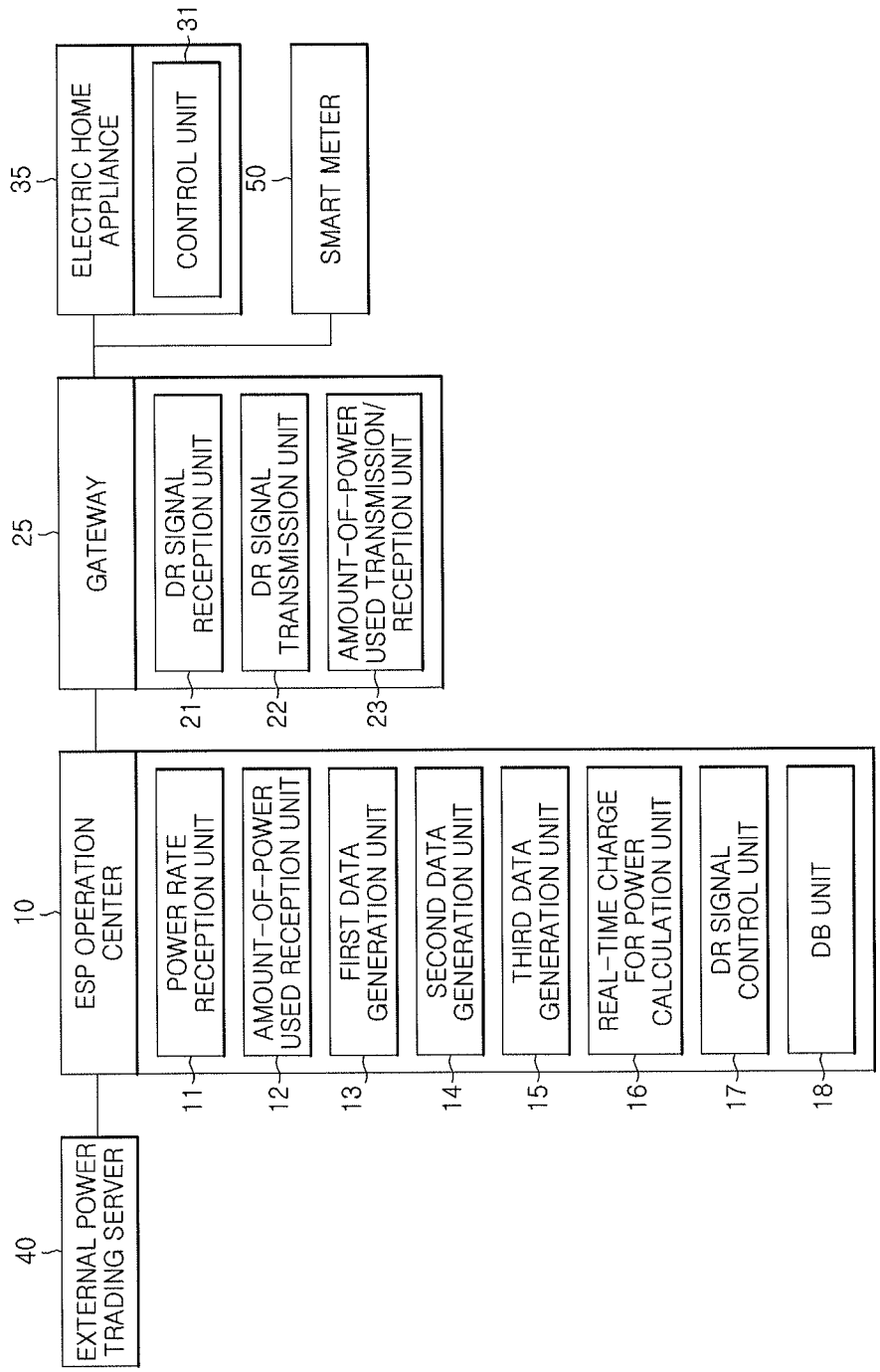
FIG. 2 is a block diagram showing the configuration of a demand response system according to an exemplary embodiment.

An exemplary configuration of the ESP operation center 10 and one of the gateways 20 will be described in detail with reference to FIG. 2.

The ESP operation center 10 may include a power rate reception unit 11 for receiving information about power rates from the external power trading server 40. The ESP operation center 10 may further include an amount-of-power used reception unit 12 for receiving information about the amounts of power used by the customer from a respective gateway 25. The ESP operation center 10 may further include a database (DB) unit 18 for storing the received power rate information for the customer and the received amount-of-power used information by the customer. The ESP operation center 10 may further include a first data generation unit 13 for generating first data including information about charge rates for unit of power for respective time spans from a start time point to an end time point, by using the received power rate information. The ESP operation center 10 may include a second data generation unit 14 for generating second data including information about the amounts of power used by the consumer for respective time spans from the start time to the end time point, by using the received amount-of-power used by the customer information. The ESP operation center 10 may further include a third data generation unit 15 for generating third data including information about the index power charges to the customer for respective time spans from the start time point to the end time point by using the first data and the second data. The ESP operation center 10 may further include a demand response (DR) signal control unit 17 for dividing the index power charges into a plurality of index sections using the third data and generating the DR signal required to control each electric home appliance. The ESP operation center 10 may further include a real-time charge for power calculation unit 16 for calculating the real-time charges for the power used by the customer.

The gateway 25 may include an amount-of-power used transmission/reception unit 23 for receiving the amount-of-power used by the customer information from the smart meter 50 and for transmitting it to the amount-of-power used reception unit 12 of the ESP operation center 10. The gateway 25 may further include a DR signal reception unit 21 for receiving the DR signal generated by the DR signal control unit 17 of the ESP operation center 10. The gateway 25 may further include a DR signal transmission unit 22 for transmitting the received DR signal to each of the respective electric home appliances 30 connected thereto over a network.

Meanwhile, in an exemplary embodiment, the smart meter 50 for measuring the amount of power used by the customer and the gateway 25 for receiving the amount of power used measured by the smart meter 50 and transmitting it to the ESP operation center 10 are described as being separate components, but it is possible that the function of the smart meter 50 is included in one or each of the gateways 20 to configure a single device. That is, the function of the smart meter 50 may be included in one or each of the gateways 20.

An electric home appliance 35 includes a control unit 31, which receives the DR signal from the DR signal transmission unit 22 of the gateway 25 and then controls the electric home appliance 35 in response to the DR signal.

Hereinafter, exemplary first to third data generation units 13 to 15 will be described in greater detail with reference to FIGS. 3 to 5.

First, exemplary first data generation unit 13 will be described with reference to FIG. 3 according to an exemplary embodiment.

The first data generation unit 13 generates first data using information about power rates received from the external power trading server 40. The first data includes information about charge rates for a unit of power for respective time spans from a start time point to an end time point. Each individual time span denotes a unit of time, which may be, but is not limited to, a second, a minute, or an hour. A period from the start time point to the end time point may be, but is not limited to, a day, a month or a week.

The following exemplary Table 1 shows information about charge rates for a unit of power for respective time spans, which are obtained when the unit of time is set to 1 minute, the start time point is set to 00 o'clock 00 minute, and the end time point is set to 24 o'clock 00 minute (i.e., 00 o'clock 00 minutes but in the next day).

TABLE 1

| Time span | Charge rate for unit of power (Won/KW) |
|---|---|
| 00 o'clock 00 minute | 7.2 |
| . | . |
| . | . |
| . | . |
| 12 o'clock 01 minute | 10.0 |
| 12 o'clock 02 minute | 10.2 |
| . | . |
| . | . |
| . | . |
| 24 o'clock 00 minute | 8.0 |

First, the first data may be mainly either a set of charge rates for a unit of power for respective time spans, or a set of the averages of charge rates for a unit of power for respective time spans, each average being the average of multiple charge rates for a unit of power for each time span.

When the first data is a set of charge rates for a unit of power for respective time spans, the first data may be information about charge rates for a unit of power, which have been obtained during a specific period corresponding to a time range from the start time point to the end time point.

That is, when the time range from the start time point to the end time point is a day (24 hours), the specific period may be any day prior to a current control time point, preferably, the day immediately before the current control time point. For example, when the time range from the start time point to the end time point is 24 hours, and the current control time point is 8 o'clock on 2 Dec. 2011, the specific period may be the day before the current control time point, that is, a period from 00 o'clock to 24 o'clock on 1 Dec. 2011. In this case, the first data is a set of charge rates for a unit of power received at every time of the day on 1 Dec. 2011. The charge rate for a unit of power may change at each time, and the graph of FIG. 3 is obtained if charge rates for a unit of power over time are indicated by a graph.

Figure 3:
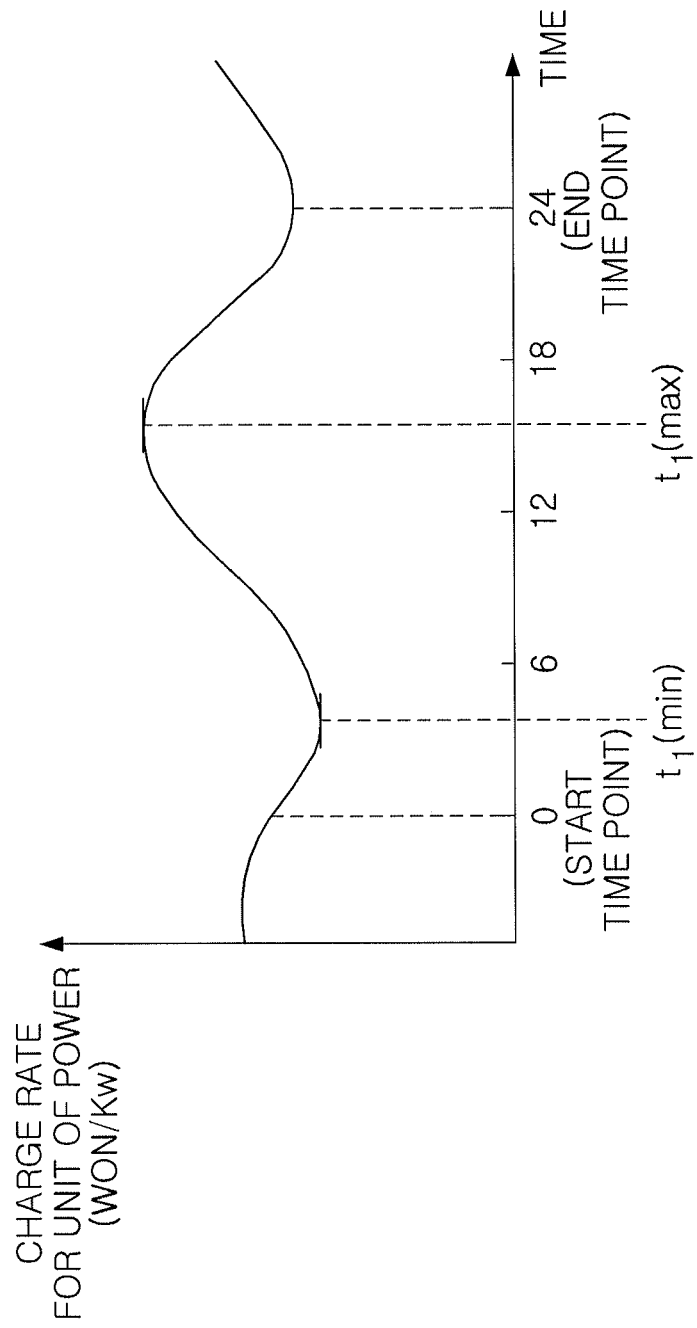
FIG. 3 is a graph showing first data ranging from a start time point to an end time point according to an exemplary embodiment.

Referring to FIG. 3, the charge rates for a unit of power may become the minimum at a time point $t_1(min)$ belonging to the time span of the dawn on the basis of a 24 hours period, and become the maximum at a time point $t_1(max)$ belonging to the time span of the afternoon. Here, the start time point is 0 o'clock and the end time point becomes 24 o'clock.

Meanwhile, when the first data is a set of the averages of multiple charge rates for a unit of power for respective time spans, the first data may be the average of charge rates for a unit of power for each identical time span repeated during a predetermined period of time. Here, the predetermined period of time may be a period from a time point at which the demand response system is initially applied to a current time point according to an exemplary embodiment. Alternatively, the predetermined period of time may be, but is not limited to, a period corresponding to the past one week, the past one month, the past three months (one quarter), or the past one year on the basis of the current time point. Further, the average of the charge rates for a unit of power for the identical time span may be the average of charge rates for a unit of power for the identical time span on individual days of the week when the predetermined period is one week. That is, when the time span (unit of time) is one minute, the charge rate for a unit of power of the first data between 12 o'clock 00 minute and 12 o'clock 01 minute may be the average of charge rates for a unit of power between 12 o'clock 00 minute and 12 o'clock 01 minute on individual days of the week from Monday to Sunday.

Further, in another exemplary embodiment, when the first data is a set of the averages of multiple charge rates for a unit of power for respective time spans, the first data may be the average of charge rates for a unit of power for each identical time span in the same month, week, day or day of the week, which is repeated during a predetermined period of time. Here, the predetermined period of time may be a longer period than the repeated interval. For example, when the repeated interval is a day, the predetermined period of time may be a month or a week. That is, when the predetermined period of time is five months, the first data may be the average of charge rates for a unit of power for each identical time span in a specific day of the week or a specific day, which is repeated for the five months. For example, when the total number of Mondays repeated for the five months is 22, the charge rates for a unit of power for respective time spans of the first data may be averages of charge rates for a unit of power for the respective identical time spans on 22 Mondays.

The second data generation unit 14 according to an exemplary embodiment will be described below with reference to FIG. 4.

The second data generation unit 14 generates second data using information about the amounts of power used by the customer for respective time spans, which have been received for a predetermined period of time. The second data includes the information about the amounts of power used by the customer for respective time spans from the start time point to the end time point. Each time span denotes a unit of time, which may be, but is not limited to, a second, a minute, or an hour. In this case, the start time point and the end time point are identical to those of the first data. A period ranging from the start time point to the end time point may be, but is not limited to, a day, a month, or a week.

Similarly to the first data, the second data may be mainly either a set of the amounts of power used for respective time spans, or a set of the averages of the amounts of power used for respective time spans, each average being the average of the multiple amounts of power used for each time span.

When the second data is a set of the amounts of power used for respective time spans, the second data may be information about the amounts of power used by the customer that have been obtained during a specific period corresponding to a time range from the start time point to the end time point. This is analogous to that of the first data, and thus a detailed description thereof will be omitted.

Figure 4:
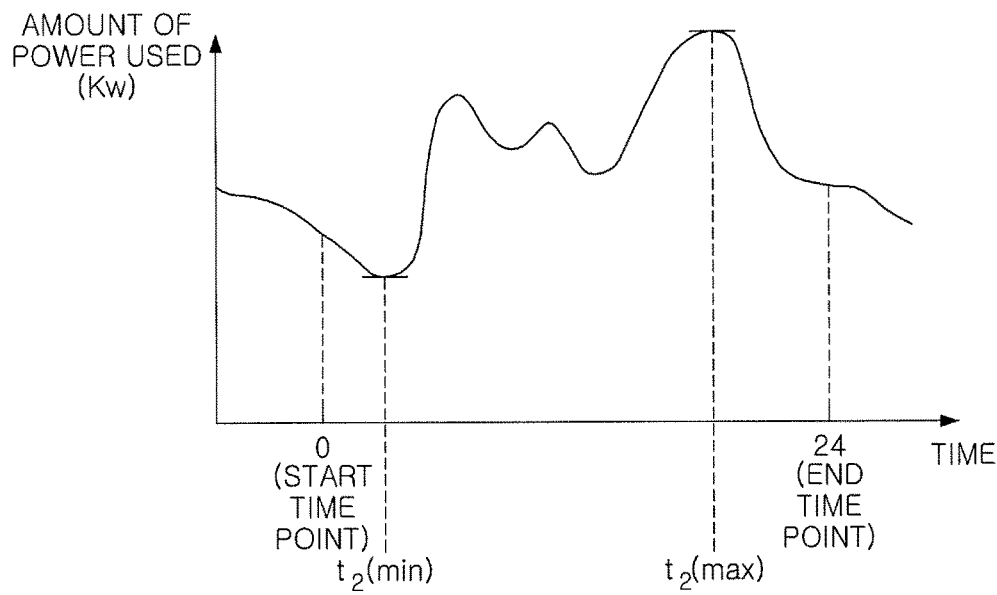
FIG. 4 is a graph showing second data ranging from a start time point to an end time point according to an exemplary embodiment.
Figure 5:
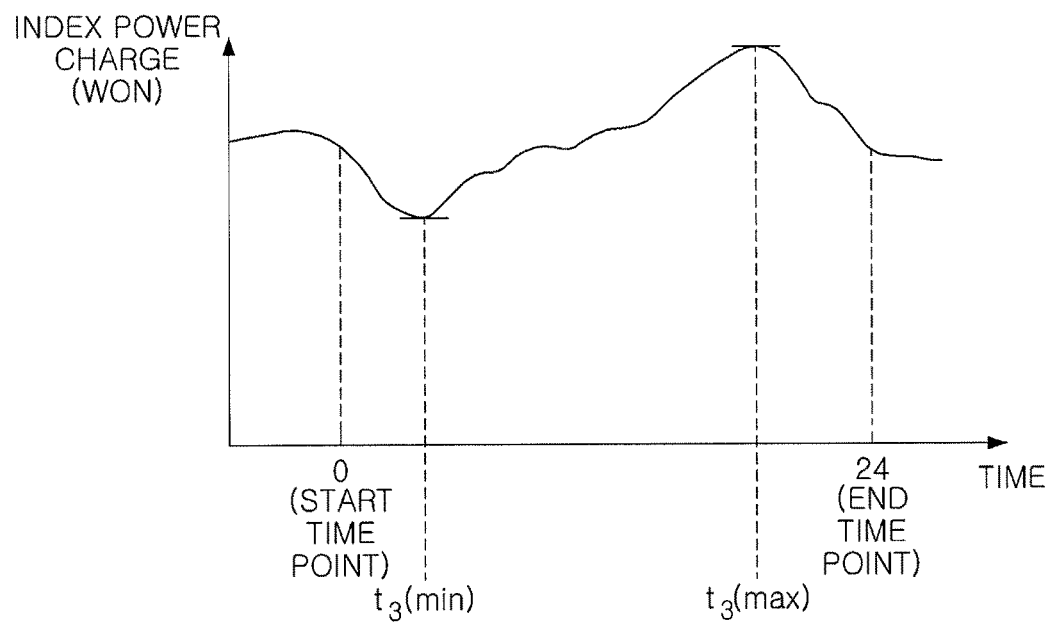
FIG. 5 is a graph showing third data ranging from a start time point to an end time point according to an exemplary embodiment.

Referring to FIG. 4, for example, the amount of power used by the customer may become the minimum at a time point $t_2(min)$ belonging to the time span of the dawn on the basis of 24 hours a day, and become the maximum at a time point $t_2(max)$ belonging to the time span of the afternoon. FIG. 4 is a graph obtained by continuously indicating the amounts of power used by the customer for respective time spans. Individual points on the graph represent the amounts of power used by the customer at corresponding times. Further, the total amount of power used by the customer during the specific period may be obtained by integrating the graph of FIG. 4 during the specific period. For example, the total amount of power used by the customer in a day can be calculated by integrating the graph ranging from 0 o'clock to 24 o'clock. In this case, the total amount of power used is the area defined by the graph ranging from 0 o'clock to 24 o'clock.

Meanwhile, when the second data is a set of the averages of the multiple amounts of power used for respective time spans, the second data may be the average of the amounts of power used by the customer for each identical time span repeated during a predetermined period of time. In another exemplary embodiment, the second data may be the average of the amounts of power used by the customer for each identical time span in the same month, week, day or day of the week, which is repeated during a predetermined period of time. In this way, when the second data is the average of the amounts of power used by the customer for each time span during the predetermined period, the second data is called a customer baseline load. The customer baseline load may represent the customer's power (electricity) usage pattern during the predetermined period of time. Meanwhile, since an exemplification of the second data is identical to that of the first data, it will be omitted here.

The third data generation unit 15 will be described according to an exemplary embodiment with reference to FIG. 5.

The third data generation unit 15 generates third data using the first data and the second data. The third data includes information about the index power charges for the customer for respective time spans from the start time point to the end time point, and is used as basis data for the generation of a DR signal. In this case, the start time point and the end time point are identical to those of the first data and the second data. The index power charge for the customer is determined depending on charge rates for a unit of power and the amounts of power used by the customer. The index power charges for the customer for respective time spans of the third data may be calculated by multiplying the charge rates for a unit of power for the time spans of the first data by the amounts of power used by the customer for the time spans of the second data. For example, the index power charge information between 12 o'clock 00 minute and 12 o'clock 01 minute may be calculated by multiplying the charge rate for a unit of power of the first data by the amount of power used by the customer of the second data during a period from 12 o'clock 00 minute to 12 o'clock 01 minute. By repeating this procedure, the index power charge information for the customer for every time span (each time span) from the start time point to the end time point can be calculated.

Meanwhile, the first data or the second data used to generate the third data may be either a set of pieces of information (charge rates for a unit of power or the amounts of power used) for respective time spans, or a set of the averages of multiple pieces of information for respective time spans. The first data and the second data may not necessarily be of the same type. That is, upon generating the third data, the first data may be a set of charge rates for a unit of power for respective time spans, and the second data may be a set of the averages of the amounts of power used for respective time spans, each average being the average of multiple charge rates for a unit of power for each time span. For example, the first data may be a set of charge rates for a unit of power for the respective time spans of 24 hours of the day before a control time point, and the second data may be a set of the averages of the amounts of power used for respective time spans of the same day of the week for a month before the control time point.

The index power charge for the customer varies depending on variations in the charge rate for a unit of power and in the amount of power used by the customer over time. For example, referring to FIG. 5, the index power charge for the customer may become the minimum at a time point $t_3(min)$ belonging to the time span of the dawn based on a 24 hours day and may become the maximum at a time point $t_3(max)$ belonging to the time span of the afternoon. FIG. 5 is a graph obtained by continuously indicating index power charges for the customer for respective time spans. Individual points on the graph indicate the index power charges for the customer at corresponding times.

Meanwhile, in accordance with an exemplary embodiment, pieces of index power charge information for respective time spans of the third data can be calculated by the following equation:

Index power charge information for time spans=
$(a*P1)*(b*P2)$ where a and b denote arbitrary constants other than 0, P1 denotes a charge rate for a unit of power for a relevant time span and P2 denotes the amount of power used for the relevant time span.

The constants a and b denote weights assigned when calculating the third data. When weights are not assigned, (a, b) may be the same constant, preferably, (1, 1). The third data is data required to generate a DR signal, and may be set such that a is greater than b when each electric home appliance is to be controlled based on the charge rate for a unit of power rather than the amount of power used by the customer. In contrast, the third data may be set such that b is greater than a when the electric home appliance is to be controlled based on the amount of power used rather than the charge rate for a unit of power. That is, the index power charges for respective time spans for the customer may be a multiplication of charge rates for a unit of power for respective time spans obtained from the first data, to which a weight other than 0 has been assigned, by the amounts of power used for respective time spans obtained from the second data, to which a weight other than 0 has been assigned. In the case of the charge rate for a unit of power obtained from the first data and the amount of power used obtained from the second data, pieces of data in the same time span are preferably multiplied.

Next, the real-time charge for power calculation unit 16 according to an exemplary embodiment will be described with reference to FIG. 6.

The real-time for power charge calculation unit 16 calculates real-time charges for power used by the customer using both real-time charge rates for a unit of power received from the power rate reception unit 11 and the real-time amounts of power used by the customer received from the amount-of-power used reception unit 12. The real-time charge for power used by the customer is calculated by multiplying the real-time charge rates for a unit of power by the real-time amounts of power used by the customer. Here, the term "real-time" denotes a current time point at which control is performed.

The DR signal control unit 17 according to an exemplary embodiment will be described with reference to FIGS. 6 to 9.

The DR signal control unit 17 performs an operation of dividing the third data into a plurality of index sections, and an operation of, when each real-time charge for power used by the customer is present in a relevant one of the index sections, generating a DR signal corresponding to the relevant index section. In this case, a single DR signal corresponding to each index section is generated. In an exemplary embodiment, the DR signal control unit 17 divides the third data into dense index sections in a range in which the index power charge is relatively high, thus increasing the effectiveness of the control of demand response. That is, wide index sections are divided in a range in which the index power charge is low, and narrow index sections are divided in a range in which the index power charge is high, thus enabling more DR signals to be generated in the range in which the real-time charge for power is high. In addition, among different DR signals, DR signals corresponding to index sections having the high index power charge may preferably be DR signals required to suppress the use of electric home appliances, compared to DR signals corresponding to index sections having the low index power charge.

The DR signal control units 17 of respective exemplary embodiments which will be described below are different in dividing the third data into a plurality of sections, and are somewhat analogous in that, when the real-time charge for power used by the customer is present in a relevant index section, a DR signal corresponding to the relevant index section is generated.

Figure 6:
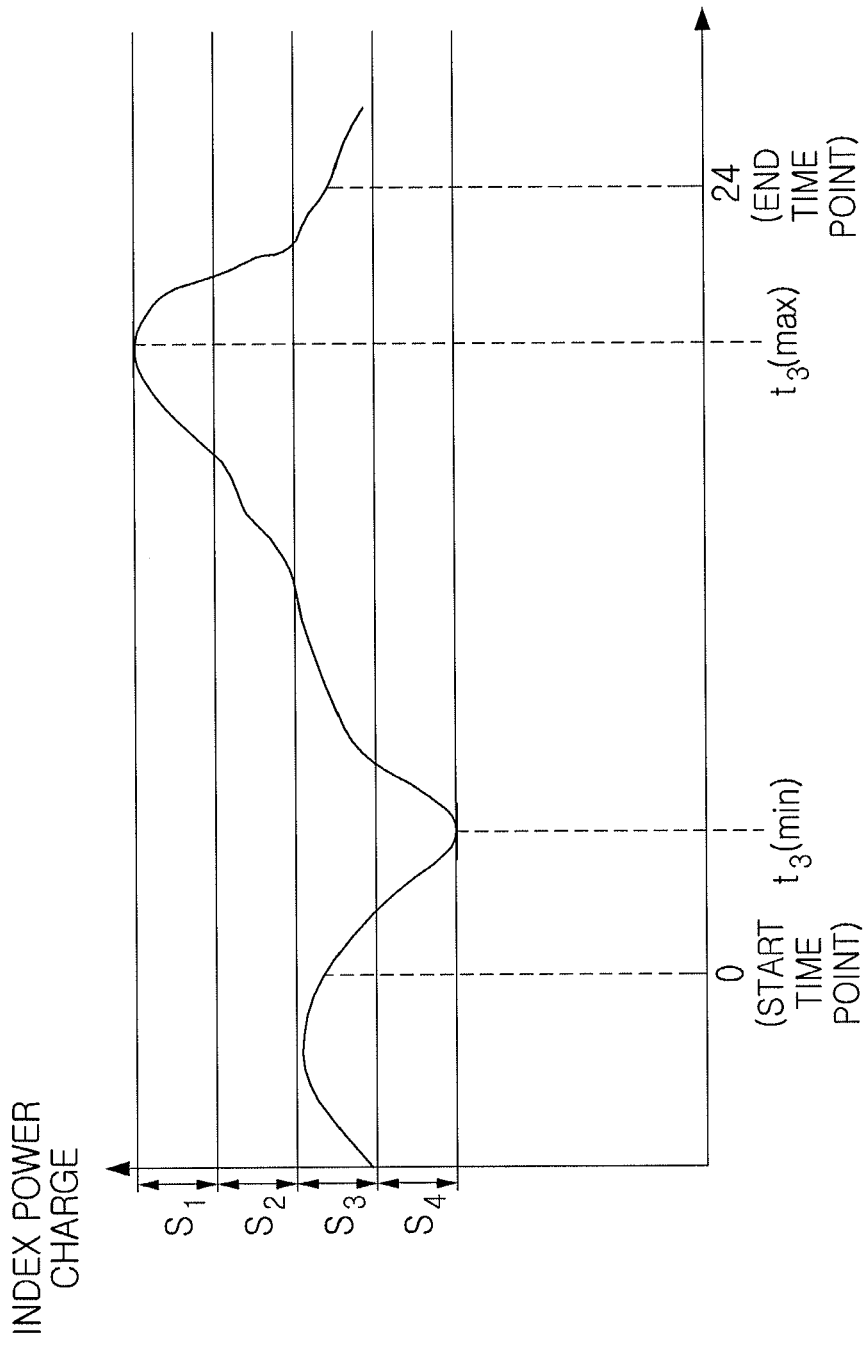
FIGS. 6 to 10 are diagrams showing a state in which the third data is divided into a plurality of index sections according to an exemplary embodiment.
Figure 7:
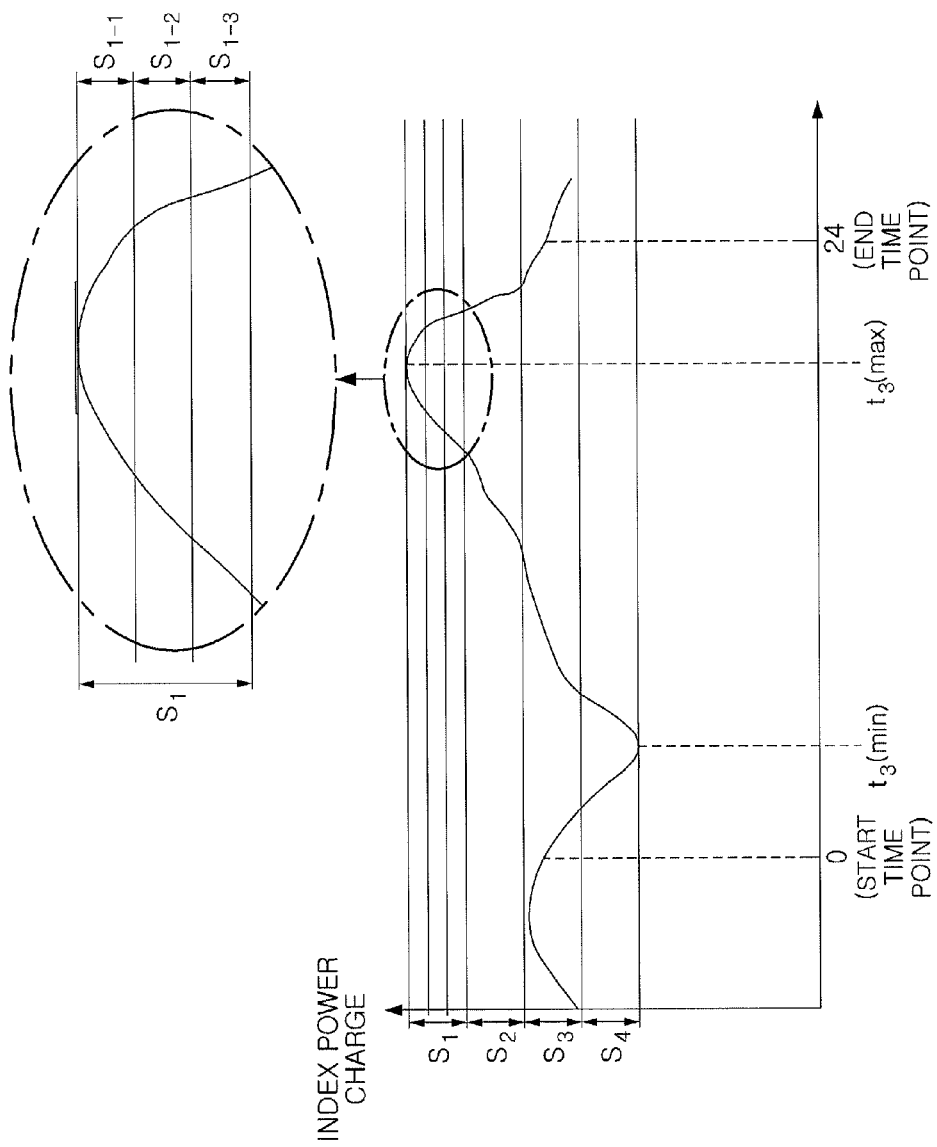

Referring to FIGS. 6 and 7, in a first exemplary embodiment, the DR signal control unit 17 may perform a first operation of dividing a range from the minimum index power charge to the maximum index power charge based on the third data into a plurality of index sections $S_1$, $S_2$, $S_3$, and $S_4$ having the same size, a second operation of dividing the index section $S_1$ having the maximum index power charge as an upper limit into a plurality of index sections $S_{1-1}$, $S_{1-2}$, and $S_{1-3}$ (shown in FIG. 7), and a third operation of, when each real-time charge for power used by the customer is present in any one of the index sections, generating a DR signal corresponding to that one index section.

First, in the first operation, in the graph of the index power charge representing the third data, the range from the minimum index power charge to the maximum index power charge is divided into index sections $S_1$, $S_2$, $S_3$, and $S_4$. Here, it is preferable that the sizes of the respective index sections be the same. The minimum index power charge appears at a time point $t_3(min)$, and the maximum index power charge appears at a time point $t_3(max)$. Referring to FIG. 7, in the second operation, among the index sections $S_1$, $S_2$, $S_3$, and $S_4$ divided in the first operation, the index section $S_1$ having the maximum index power charge as the upper limit is re-divided into a plurality of index sections $S_{1-1}$, $S_{1-2}$, and $S_{1-3}$. Therefore, a larger number of index sections are generated in the range in which the index power charge is high. In the third operation, when the real-time charge for power is present in any of the plurality of index sections divided in the first and second operations, DR signals corresponding to the relevant index sections are generated.

In the first operation, a total of four index sections $S_1$, $S_2$, $S_3$, and $S_4$ are generated from a division, and in the second operation, one of the index sections generated in the first operation is re-divided into a total of three index sections $S_{1-1}$, $S_{1-2}$, and thus a total of seven index sections $S_{1-1}$, $S_{1-2}$, $S_{1-3}$, $S_2$, $S_3$, and $S_4$ are generated from the division. When the real-time charge for power changes between the lowest index section $S_4$ and the highest index section $S_1$, a total of seven DR signals corresponding to the total of seven index sections may be generated in the third operation. The number of sections and subsections are provided by way of an example only and not by way of a limitation. One of ordinary skill in the art would readily appreciate that the real-time charge for power may be divided into different numbers of sections and/or subsections.

Meanwhile, when the real-time charge for power falls outside the lowest index section $S_4$ and is then present in a range below the lowest index section, a DR signal corresponding to the lowest index section is generated. Further, when the real-time charge for power falls outside the highest index section $S_1$ and is then present in a range above the highest index section, a DR signal corresponding to the highest index section is generated. This is also applied to the DR signal control units 17 according to second to fourth exemplary embodiments, which will be described below in greater detail.

The DR signal control unit of the demand response system according to an exemplary embodiment re-divides the index section $S_1$ having the maximum index power charge as the upper limit, thus enabling more DR signals to be generated in the range having the high index power charge. Therefore, electric home appliances can be more efficiently controlled. That is, in an exemplary embodiment, the control of the electric home appliances may be more precisely performed near the maximum index power charge and can be more efficiently performed.

Figure 8:
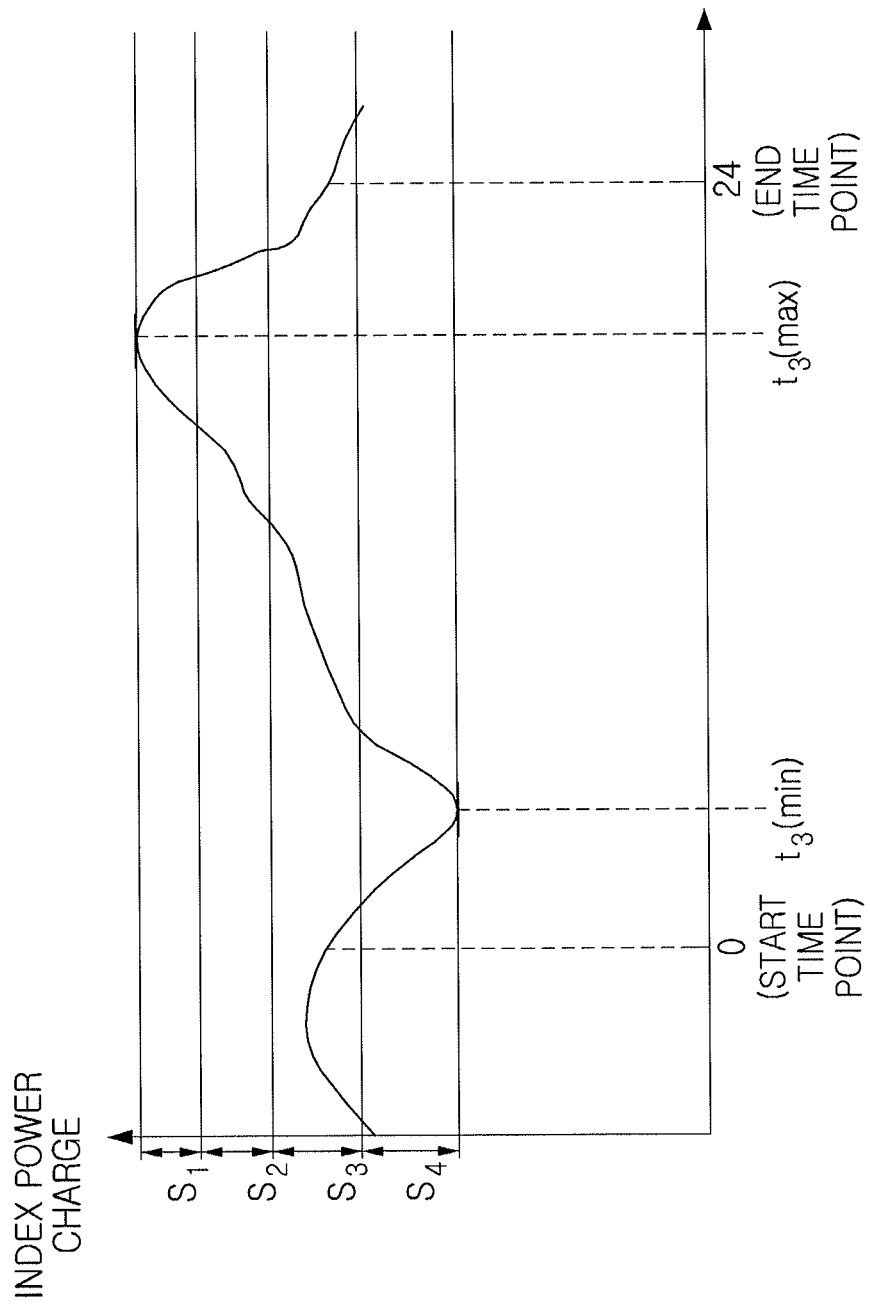

Referring to FIG. 8, the DR signal control unit 17 according to a second exemplary embodiment divides a range from the minimum index power charge to the maximum index power charge based on the third data into a plurality of index sections $S_1$, $S_2$, $S_3$, and $S_4$, and the index sections are divided such that the size of index sections increases in a direction from the index section $S_1$ having the maximum index power charge as an upper limit to the index section $S_4$ having the minimum index power charge as a lower limit. That is, the size of the index section $S_1$ having the maximum index power charge as the upper limit is set to the smallest value, and the size of the index section $S_4$ having the minimum index power charge as the lower limit is set to the largest value. However, a relationship between two adjacent index sections $S_2$ and $S_3$ is set such that the size of the upper index section $S_2$ in a range having the higher index power charge is less than that of the lower index section $S_3$. Therefore, the sizes of the index sections satisfy $S_1 < S_2 < S_3 < S_4$.

Figure 9:
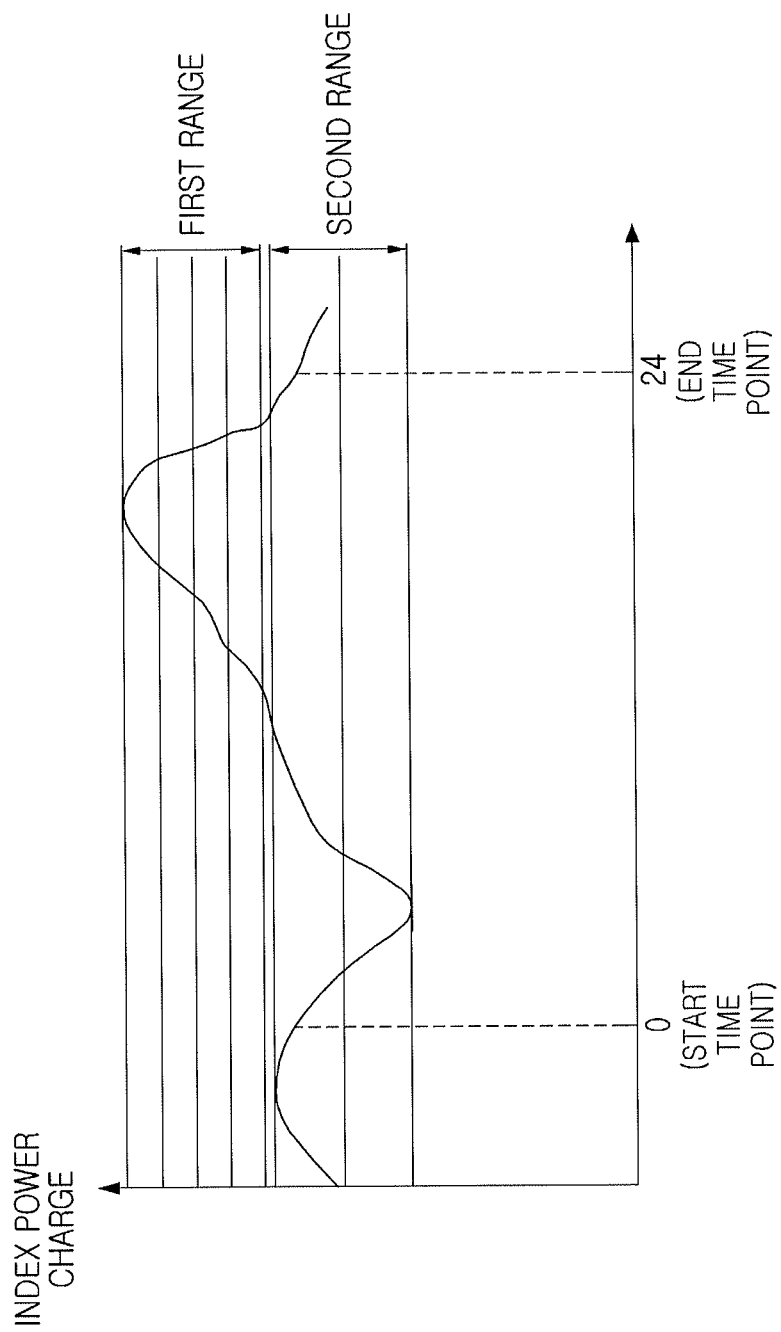

Referring to FIG. 9, the DR signal control unit 17 according to a third exemplary embodiment divides a range from the minimum index power charge to the maximum index power charge based on the third data into a plurality of index sections, and may be configured such that the number of index sections set in a second range having the minimum index power charge as a lower limit is smaller than the number of index sections set in a first range having the maximum index power charge as an upper limit and having the same size as the second range. In other words, the range may be configured such that the number of index sections set in the first range having the maximum index power charge as the upper limit is greater than the number of index sections set in the second range having the minimum index power charge as the lower limit and having the same size as the first range. That is, the number of index sections generated in the first range, having the maximum index power charge as the upper limit, of the two ranges having the same size, is greater than the number of index sections generated in the second range having the minimum index power charge as the lower limit. Therefore, in the range in which the index power charge is relatively high, the number of index sections increases, and thus the effectiveness of the control of demand response can be improved.

Figure 10:
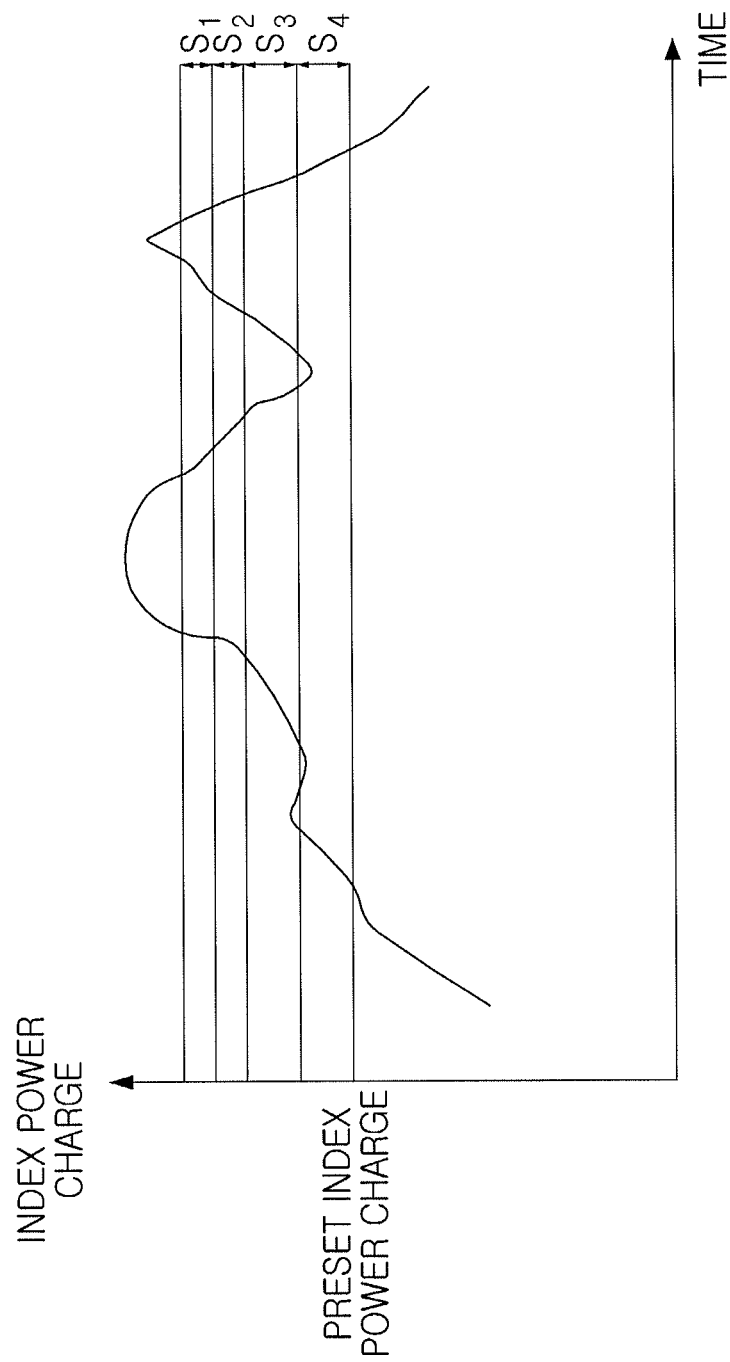

Meanwhile, referring to FIG. 10, the DR signal control unit 17 according to a fourth exemplary embodiment divides a range above a preset index power charge into a plurality of index sections $S_1$, $S_2$, $S_3$, and $S_4$. That is, the index sections are not divided based on the minimum index power charge and the maximum index power charge present in the third data. In this case, the real-time charge for power used by the customer can be calculated by multiplying the real-time charge rate for a unit of power at a current control time point by the real-time amount of power used by the customer at the current control time point. When the real-time charge for power is present in the range above the preset index power charge, a DR signal corresponding to a relevant index section is generated, and each electric home appliance can be controlled in response to the generated DR signal.

Hereinafter, the control of electric home appliances based on generated DR signals according to an exemplary embodiment will be described.

First, first data to third data generated in first to third exemplary embodiments are generated prior to at least a time point at which the electric home appliances are controlled.

That is, the DR signal control unit must fix the minimum index power charge and the maximum index power charge of the third data, so that a minimum predetermined period (from a start time point to an end time point) must elapse. For example, the date of the time point at which control is performed is 00 o'clock on (Friday) 2 Dec. 2011, the first data to third data are generated before 00 o'clock on 2 December. In this case, as described above, the first data to third data may be real-time charge rates for a unit of power, the amounts of power used by the customer, and index power charges based on them, which have been received for one day on 1 December. Alternatively, the third data may be generated by multiplying the averages of charge rates for a unit of power for respective time spans and the averages of the amounts of power used by the customer for respective time spans, which have been obtained on every Friday for the past four weeks, by each other. In this way, index sections are divided using the third data generated before 00 o'clock on 2 December. When the real-time index power charge for the customer at the current control time point falls within a relevant range, a DR signal corresponding to the relevant range is generated, and the generated DR signal is transmitted to each electric home appliance and is then used to control the electric home appliance.

Figure 11:
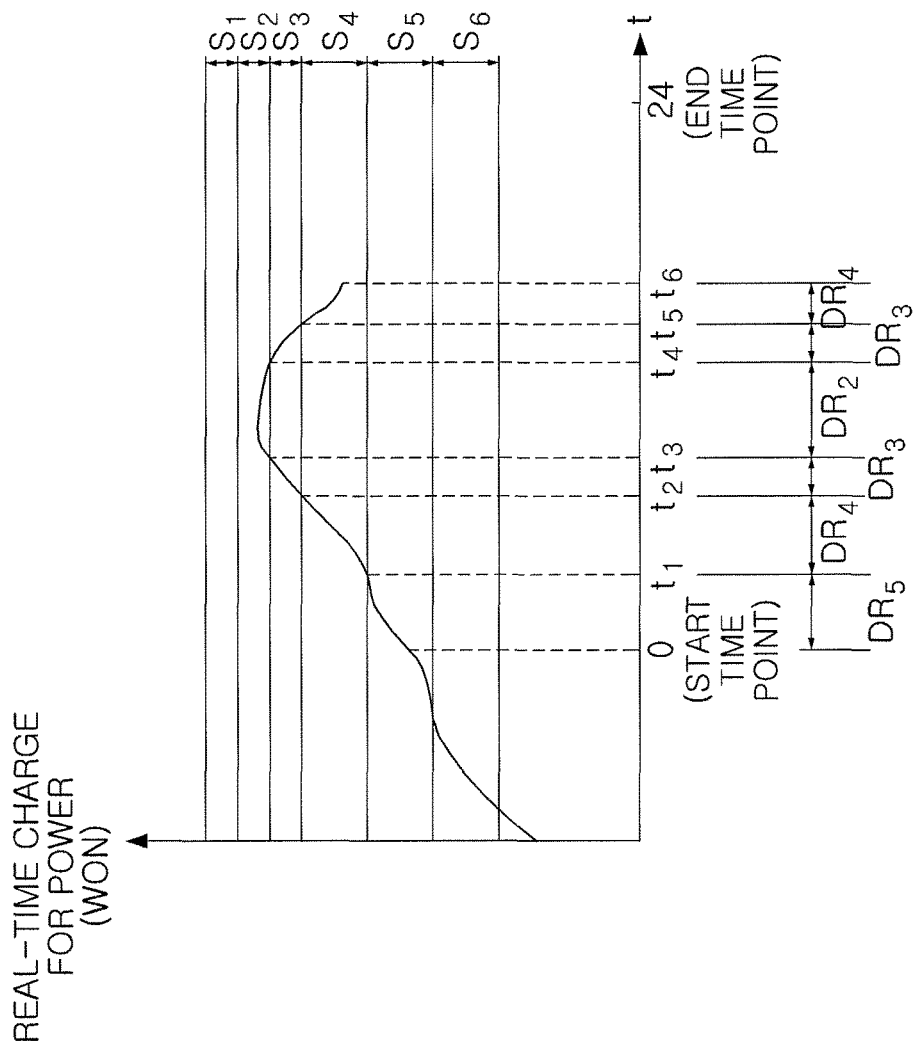
FIG. 11 is a diagram showing the generation of demand/response (DR) signals depending on a real-time charge for power used according to an exemplary embodiment.

Referring to FIG. 11, the DR signal control unit 17 divides the index power charge of the third data into a total of six index sections $S_1$, $S_2$, $S_3$, $S_4$, $S_5$, and $S_6$. When the real-time charge for power used by the customer is present in a specific index section, the DR signal control unit 17 generates a DR signal corresponding to the specific index section. The DR signal is transmitted to the gateway 20 installed in the customer's premises, and the gateway 20 transmits the DR signal to the control unit 31 of each of the electric home appliances 30. The control unit 31 that received the DR signal controls a corresponding one of the electric home appliances 30 in response to the DR signal. Here, the DR signal corresponding to a relatively high index section may preferably be a control signal required to suppress the use of the electric home appliance compared to the DR signal corresponding to a relatively low index section.

In the case of, for example, the real-time charge for power used by the customer information shown in FIG. 11, since the power charge falls within the range of the fifth index section $S_5$ during an interval from 0 o'clock to time $t_1$, the DR signal control unit generates a $DR_5$ signal and causes each of the electric home appliances 30 to be controlled in response to the generated $DR_5$ signal. When the time $t_1$ has elapsed, the real-time charge for power used by the customer further increases and then is within the range of the fourth index section $S_4$. In this case, the DR signal control unit 17 generates a $DR_4$ signal and causes each of the electric home appliances 30 to be controlled in response to the generated $DR_4$ signal. In the same manner, each electric home appliance is controlled in response to a $DR_3$ signal during an interval from time $t_2$ to time $t_3$, is controlled in response to a $DR_2$ signal during an interval from time $t_3$ to time $t_4$, and is controlled in response to a $DR_3$ signal during an interval from time $t_4$ to $t_5$. That is, as DR signals, $DR_5$, $DR_4$, $DR_3$, $DR_2$, $DR_3$, and $DR_4$ are respectively generated during the time interval from 0 to $t_1$, the time interval from $t_1$ to $t_2$, the time interval from $t_2$ to $t_3$, the time interval from $t_3$ to $t_4$, the time interval from $t_4$ to $t_5$, and the time interval from $t_5$ to $t_6$. The electric home appliance is controlled in response to each DR signal.

Figure 12:
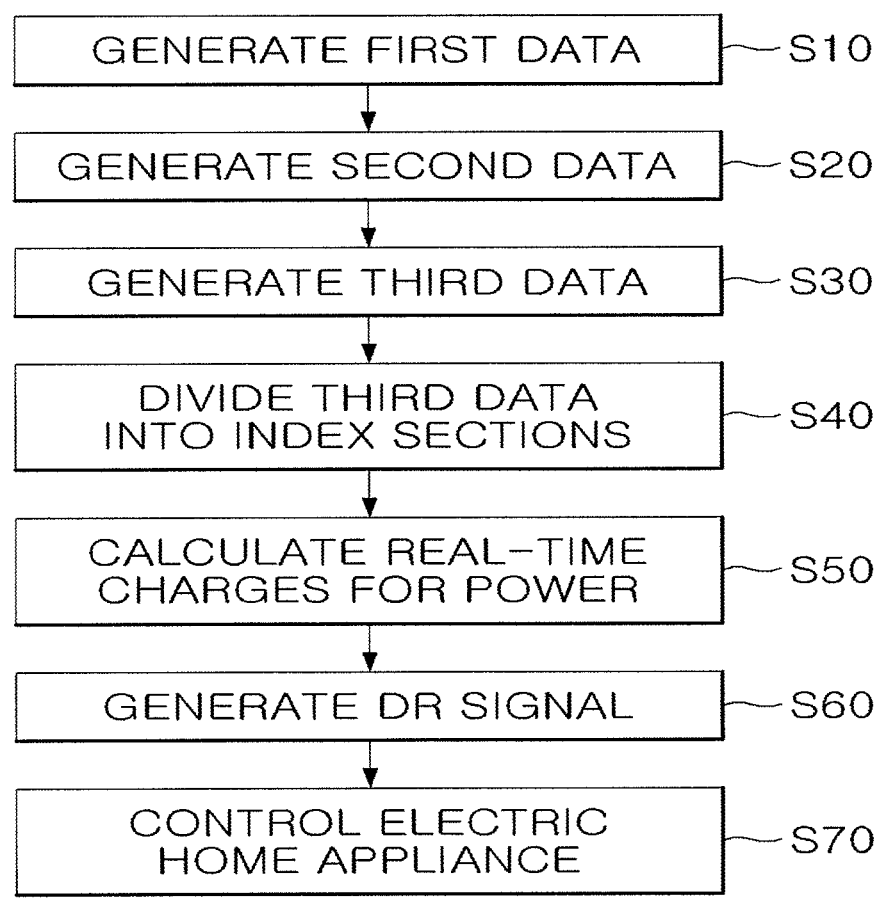
FIG. 12 is a flowchart showing a demand response method according to an exemplary embodiment.

Hereinafter, a demand response method according to an exemplary embodiment will be described with reference to FIG. 12.

The demand response method according to an exemplary embodiment may include an operation S10 in which first data including information about charge rates for a unit of power for respective time spans from a start time point to an end time point is generated, an operation S20 in which second data including information about the amounts of power used by a customer for respective time spans from the start time point to the end time point is generated, and operation S30 in which third data including information about the index power charges for the customer for respective time spans from the start time point to the end time point is generated. The demand response method may further include operation S40 in which the third data is divided into a plurality of index sections. The demand response method may further include operation S50 in which the real-time charges for power used by the customer is calculated using the information about real-time charge rates for a unit of power and the real-time amounts of power used by the customer. The demand response method may further include an operation S60 in which, when each real-time charge for power is present in any of the index sections, a DR signal corresponding to the aforementioned index section is generated. In addition, the demand response method may further include an operation S70 in which each electric home appliance is controlled in response to the DR signal.

In the first data generation operation S10, the first data generation unit 13 of the ESP operation center 10 generates the first data using power rate information received from the external power trading server 40. The first data includes information about charge rates for a unit of power for respective time spans from the start time point to the end time point. Each time span denotes a unit of time, which may be, but is not limited to, a second, a minute, or an hour. In this case, a period from the start time point to the end time point may be, but is not limited to, a day, a month, or a week. The first data may be a set of charge rates for a unit of power for respective time spans or a set of the averages of charge rates for a unit of power for respective time spans, each average being the average of multiple charge rates for a unit of power for each time span.

In the second data generation operation S20, the second data generation unit 14 of the ESP operation center 10 generates the second data using information about the amounts of power used by the customer for respective time spans, which have been received for a predetermined period of time. The second data includes information about the amounts of power used by the customer for respective time spans from the start time point to the end time point. Each time span denotes a unit of time, which may be, but is not limited to, a second, a minute, or an hour. In this case, the start time point and the end time point are identical to those of the first data, and a period from the start time point to the end time point may be, but is not limited to, a day, a month, or a week.

Similarly to the first data, the second data may be either a set of the amounts of power used for respective time spans, or a set of the averages of the amounts of power used for respective time spans, each average being the average of the multiple amounts of power used for each time span.

Meanwhile, the first data generation operation S10 and the second data generation operation S20 may be performed in a reverse order or simultaneously. That is, the first data and the second data may be simultaneously generated or, alternatively, the second data may be primarily generated and the first data may be subsequently generated. In other words, the first data generation operation S10 and the second data generation operation S20 are not limited by a sequence explained above with respect to an exemplary embodiment.

In the third data generation operation S30, the third data generation unit 15 of the ESP operation center 10 generates the third data using the first data and the second data. The third data includes information about the index power charges for the customer for respective time spans from the start time point to the end time point, and is used as basis data for the generation of DR signals. In this case, the start time point and the end time point are identical to those of the first data and the second data. The index power charges for the customer for respective time spans of the third data may be calculated by multiplying the charge rates for a unit of power for respective time spans of the first data by the amounts of power used by the customer for respective time spans of the second data. In an exemplary embodiment, the index power charges for respective time spans of the third data may be calculated by the following equation:

Index power charge information for time spans= $(a*P1)*(b*P2)$ where a and b denote arbitrary constants other than 0, P1 denotes a charge rate for a unit of power of the first data for a relevant time span and P2 denotes the amount of power used based on the second data for the relevant time span.

The constants a and b denote weights assigned upon calculating the third data. When weights are not assigned, (a, b) may be the same constant, preferably, (1, 1). The third data is data required to generate a DR signal, and may be set such that a is greater than b when each electric home appliance is desired to be controlled based on the charge rate for a unit of power rather than the amount of power used by the customer. In contrast, the third data may be set such that b is greater than a when the electric home appliance is desired to be controlled based on the amount of power used rather than the charge rate for a unit of power.

The operation S40 includes dividing the third data into the plurality of index sections and may include the first operation of dividing a range from the minimum index power charge to the maximum index power charge of the third data into a plurality of index sections having the same size, and another operation of dividing an index section having the maximum index power charge as an upper limit into a plurality of index sections.

In more detail, in the first operation, the DR signal control unit 17 of the ESP operation center 10 divides the range from the minimum index power charge to the maximum index power charge in the index power charge graph representing the third data into a plurality of index sections. In this case, it is preferable that the sizes of the index sections be the same. In the second operation, among the index sections obtained from the division in the first operation, the index section having the maximum index power charge as the upper limit is re-divided into a plurality of index sections. Therefore, a larger number of index sections are generated in a range in which the index power charge is high.

Meanwhile, the operation S40 includes dividing the third data into the plurality of index sections may be configured such that the range from the minimum index power charge to the maximum index power charge of the third data is divided into a plurality of index sections and such that the size of index sections increases in a direction from the index section having the maximum index power charge as the upper limit to an index section having the minimum index power charge as a lower limit. That is, the size of the index section (the highest index section) having the maximum index power charge as the upper limit is set to the smallest value, and the size of the index section (the lowest index section) having the minimum index power charge as the lower limit is set to the largest value, but a relationship between two adjacent index sections is set such that the size of a higher index section in a range having the higher index power charge is smaller than the size of a lower index section.

Meanwhile, the operation S40 includes dividing the third data into a plurality of index sections may be performed such that a range from the minimum index power charge to the maximum index power charge of the third data is divided into a plurality of sections and such that the number of DR signals set in a second range having the minimum index power charge as a lower limit is less than the number of DR signals set in a first range that has the maximum index power charge as the upper limit and that has the same size as the first range. In other words, the range may be configured such that the number of DR signals set in the first range having the maximum index power charge as the upper limit is greater than the number of DR signals set in the second range having the minimum index power charge as the lower limit and having the same size as the first range. That is, the number of DR signals generated in the first range having the maximum index power charge as the upper limit, of the two ranges having the same size, is greater than the number of DR signals generated in the second range having the minimum index power charge as the lower limit. Therefore, in the range in which the index power charge is relatively high, the number of DR signals increases, and thus the effectiveness in controlling the demand response can be improved in response to the DR signals.

The operation S50 includes calculating the real-time charges for power used by the customer for respective time spans is configured such that the real-time charge for power calculation unit 16 of the ESP operation center 10 calculates the real-time charges for power used by the customer for respective time spans using both information about the real-time charge rates for a unit of power received from the power rate reception unit 11 and information about the real-time amounts of power used by the customer received from the amount-of-power used reception unit 12. The real-time charge for power used by the customer is calculated by multiplying the real-time charge rate for a unit of power by the real-time amount of power used by the customer. Here, the term "real-time" refers to a current time point at which control is performed.

The operation S60 includes generating the DR signal corresponding to the index section. For example, when the real-time charge for power is present in a specific index section, the DR signal control unit 17 generates a DR signal corresponding to the specific index section. Here, it is preferable that the DR signal corresponding to a relatively high index section be a signal required to suppress the use of electric home appliances compared to a DR signal corresponding to a relatively low index section.

In operation S70, each electric home appliance is controlled in response to the DR signal, each of the electric home appliances 30 is controlled in response to the generated DR signal. The generated DR signal is transmitted to one of the gateways 20 installed in the customer's premises, and this one of the gateways 20 transmits the DR signal to the control unit 31 of each electric home appliance. The control unit 31 that received the DR signal controls the corresponding electric home appliance in response to the DR signal.

Figure 13:
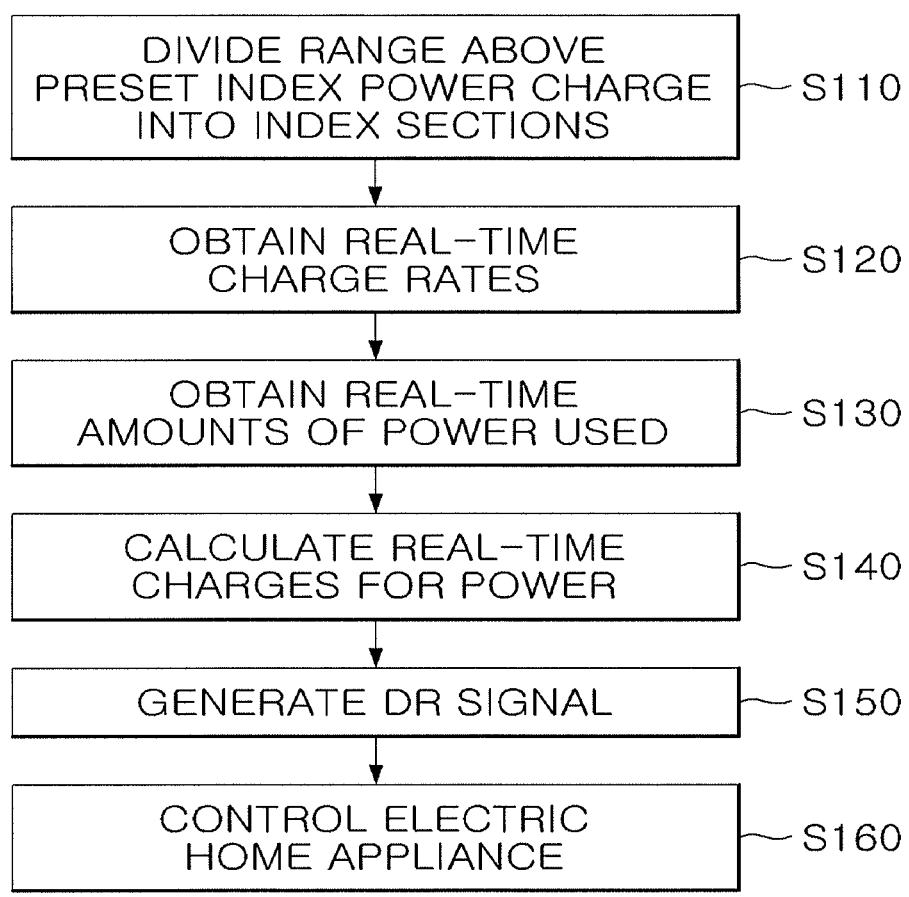
FIG. 13 is a flowchart showing a demand response method according to another exemplary embodiment.

A demand response method according to yet another exemplary embodiment will be described with reference to FIG. 13.

The demand response method according to yet another exemplary embodiment may include an operation S110 in which a range above a preset index power charge is divided into a plurality of index sections, an operation S120 in which information about real-time charge rates for a unit of power is obtained, an operation S130 in which information about the real-time amounts of power used by the customer is obtained, an operation S140 in which the real-time charge rates for a unit of power is multiplied by the real-time amounts of power used by the customer, thus calculating the real-time charges for power used by the customer, an operation S150 in which, when the real-time charge for power is present in any one of the index sections obtained from the division, generating a DR signal corresponding to the index section, and an operation S160 in which each electric home appliance is controlled in response to the DR signal.

In the operation S110, the range above the preset index power charge is divided into the plurality of index sections, the DR signal control unit 17 of the ESP operation center 10 divides the range above the preset index power charge, which has been previously input, into a plurality of index sections. Here, the preset index power charge may vary according to the manipulation of the user.

The operation S120 includes obtaining, by the power rate reception unit 11 of the ESP operation center, the information about the real-time charge rates for a unit of power. That is, the power rate reception unit 11 obtains the information about the real-time charge rates for a unit of power from the external power trading server 40.

The operation S130 includes obtaining, by the amount-of-power used reception unit 12 of the ESP operation center, the information about the real-time amounts of power used by the customer. That is, the amount-of-power used reception unit 12 obtains the real-time amounts of power used by the customer from one of the gateways 20 installed in the customer's premises.

The operation S140 includes calculating, by the real-time power charge calculation unit 16 of the ESP operation center 10, the real-time charges for power used by the customer. The real-time charge for power calculation unit calculates the real-time charges for power used by the customer by multiplying the received real-time charge rates for a unit of power by the real-time amounts of power used by the customer.

In operation S150, the DR signal is generated, when the real-time charge for power is present in any one of the index sections, the DR signal control unit 17 generates a DR signal corresponding to the one index section.

In operation S160, the electric home appliance is controlled in response to the DR signal. For example, each of the electric home appliances 30 is controlled in response to the generated DR signal. The generated DR signal is transmitted to one of the gateways 20 installed in the customer's premises, and this one of the gateways 20 transmits the DR signal to the control unit 31 of each electric home appliance. The control unit 31 that received the DR signal controls the electric home appliance in response to the DR signal.

According to an exemplary embodiment, the control of demand response is performed based on the real-time charges for power used by a customer, thus improving efficiency in the control of the demand response.

Further, in an exemplary embodiment, division into dense index sections is performed in a range in which the index power charge is relatively high, thus increasing effectiveness in the control of demand response.

Although exemplary embodiments have been described above for illustrative purposes, those skilled in the art will readily appreciate that various modifications, additions and substitutions of exemplary embodiments are possible, without departing from the scope and spirit of the present disclosure, which is provided in the accompanying claims and their equivalents. As described above, exemplary embodiments are merely exemplary and are not to be construed as limiting. Those skilled in the art can implement various changes and modifications from the above description of exemplary embodiments. Moreover, various modifications to these exemplary embodiments will be readily apparent to those skilled in the art, and the generic principles and specific examples defined herein may be applied to other exemplary embodiments.

What is claimed is:

1. A demand response method comprising:
generating first data comprising information about charge rates for a unit of power for respective time spans;
generating second data comprising information about amounts of power used for the respective time spans;
calculating, by a computer, third data comprising information about index power charges for the respective time spans calculated based on a combination of the first data and the second data; and
dividing the third data into a plurality of index sections such that dense index sections are generated in the time spans in which the index power charges are above a predetermined, index power charge threshold;
generating a Demand Response (DR) signal when use of the power is in an index section of the plurality of index sections in which each real-time charge for the power is present;
outputting the DR signal to an electric home appliance;
controlling the electric home appliance in response to receiving the generated DR signal,
wherein the dense index sections are denser index sections, at least at a point in time, than others of the index sections, at the point in time, and the others of the index sections are below the predetermined index power charge threshold.

2. The demand response method according to claim 1, further comprising calculating real-time charges for the power used by a customer by multiplying real-time charge rates for the unit of power by real-time amounts of power used by the customer.

3. The demand response method according to claim 1, wherein the first data is a set of charge rates for the unit of power for the respective time spans, which have been obtained during a specific period of time.

4. The demand response method according to claim 1, wherein the first data is an average of charge rates for the unit of power for each identical time span that is repeated during a predetermined period of time.

5. The demand response method according to claim 1, wherein the second data is a set of amounts of power used by a customer for the respective time spans, which have been obtained during a specific period of time.

6. The demand response method according to claim 1, wherein the second data is a customer baseline load which is an average of amounts of power used by a customer for each identical time span, which is repeated during a predetermined period of time.

7. The demand response method according to claim 1, wherein the dividing the third data into the plurality of index sections comprises:
dividing a range from a minimum index power charge to a maximum index power charge of the third data into a plurality of index sections having an identical size; and
dividing one of the plurality of index sections having the maximum index power charge as an upper limit into a plurality of index subsections.

8. The demand response method according to claim 1, wherein the dividing the third data into the plurality of index sections comprises:
dividing a range from a minimum index power charge to a maximum index power charge of the third data into the plurality of index sections,
wherein a size of the plurality of index sections increases in a direction from an index section having the maximum index power charge as an upper limit to an index section having the minimum index power charge as a lower limit.

9. The demand response method according to claim 1, wherein the dividing the third data into the plurality of index sections comprises:
dividing a range from a minimum index power charge to a maximum index power charge of the third data into the plurality of index sections,
wherein a number of index sections set in a first range having the maximum index power charge as an upper limit is greater than a number of index sections set in a second range having the minimum index power charge as a lower limit, and
wherein the second range has a size identical to the first range.

10. The demand response method according to claim 1, wherein the dividing the third data into the plurality of index sections comprises dividing a range above a preset index power charge into the plurality of index sections.

11. The demand response method according to claim 7, further comprising: when the real-time charge for power is below a lowest index section, generating the DR signal corresponding to the lowest index section, and
when the real-time charge for power is above a highest index section, generating the DR signal corresponding to the highest index section.

12. A demand response system comprising:
at least one hardware processor configured to implement:
receiving information about charge rates for a unit of power from an external power trading server;
receiving information about amounts of power used by a customer from a gateway installed in premises of the customer;
generating first data comprising information about charge rates for the unit of power for respective time spans based on the received information about the charge rates;
generating second data comprising information about amounts of power used by the customer for the respective time spans based on the received information about the amounts of power used;
generating third data comprising information about index power charges for the customer for the respective time spans obtained based on a combination of the first data and the second data; and
dividing the third data generated by the third data generator into a plurality of index sections such that dense index sections are generated in the time spans in which the index power charges are above a predetermined, index power charge threshold; generating a Demand Response (DR) signal when use of the power is in an index section of the plurality of index sections in which each real-time charge for the power is present, to output the DR signal to an electric home appliance and to control an electric home appliance in response to receiving the generated DR signal,
wherein the dense index sections are denser index sections, at least at a point in time, than others of the index sections, at the point in time, and
the others of the index sections are below the predetermined index power charge threshold.

13. The demand response system according to claim 12, wherein the at least one hardware processor is further configured to:
calculate the real-time charges for the power used by the customer by multiplying the real-time charge rates for the unit of power, which are received from the power rate receiver, by the real-time amounts of power used by the customer, which are received from the amount-of-power used receiver.

14. The demand response method according to claim 1, wherein each of the index power charges is calculated by multiplying a respective charge rate for the unit of power in a respective time span by a respective amount of power used in the same respective time span and wherein a first weight is applied to the respective charge rate and a second weight is applied to the respective amount of power used.

15. The demand response method according to claim 1, wherein each of the dense index sections respectively comprises a narrower range of an index power charge spectrum than other index sections.

16. The demand response method according to claim 1, wherein each of the index sections comprise ones of a plurality of ranges of index power charges at the point in time,
wherein the denser index sections at the point in time comprise narrower ones of the plurality of ranges than ones of the plurality of ranges of the others of the index sections at the point in time,
wherein the narrower ones of the plurality of ranges comprise fewer index power charge amounts than the ones of the plurality of ranges of the others of the index sections, and
wherein the each of the values of the fewer index power chare amounts of the narrower ones of the plurality of ranges is greater than each of the values of index power charges of the ones of the plurality of ranges of the others of the index sections.

17. The demand response method according to claim 1, wherein at least one of the denser index sections comprises a maximum calculated index power charge during the respective time spans, and
wherein the narrower ones of the plurality of ranges sequentially extend, at the point in time and in the index power charges of the third data, from the maximum calculated index power charge to the predetermined, index power charge threshold.

* * * * *